United States Patent [19]
Stein et al.

[11] Patent Number: 6,140,987
[45] Date of Patent: Oct. 31, 2000

[54] USER INTERFACE FOR HOME AUTOMATION SYSTEM

[75] Inventors: Michael Stein, Naples, Fla.; Toby Ray Kaufman, Sylmar, Calif.; Yves Alexander Richarz, Burbank, Calif.; Kenneth Allen Tarlow, Corte Madera, Calif.; Bryce Craig Nesbitt, Berkeley, Calif.

[73] Assignee: IntelliNet, Inc., Naples, Fla.

[21] Appl. No.: 08/836,472

[22] PCT Filed: Sep. 18, 1996

[86] PCT No.: PCT/US96/14520

§ 371 Date: Nov. 20, 1997

§ 102(e) Date: Nov. 20, 1997

[87] PCT Pub. No.: WO97/11448

PCT Pub. Date: Mar. 27, 1997

[51] Int. Cl.$^7$ .................................................. G09G 3/36
[52] U.S. Cl. ............................................. 345/87; 345/173
[58] Field of Search ................................... 345/87, 88, 89, 345/103, 104, 173–179

[56] References Cited

U.S. PATENT DOCUMENTS

| | | | |
|---|---|---|---|
| 3,187,321 | 6/1965 | Kameny | 340/345 |
| 4,066,850 | 1/1978 | Heys, Jr. | 200/5 A |
| 4,360,716 | 11/1982 | Fiorella | 200/5 A |
| 4,543,563 | 9/1985 | Wine | 340/365 |
| 4,789,858 | 12/1988 | Fergason et al. | 340/784 |
| 4,810,937 | 3/1989 | Havel | 315/152 |
| 4,821,029 | 4/1989 | Logan et al. | 340/712 |
| 4,827,410 | 5/1989 | Corren | 364/200 |
| 4,899,137 | 2/1990 | Behrens et al. | 340/711 |
| 4,916,699 | 4/1990 | Ohashi | 371/17 |
| 4,959,642 | 9/1990 | Sharples | 340/716 |
| 5,034,602 | 7/1991 | Garcia, Jr., et al. | 250/227.22 |
| 5,097,396 | 3/1992 | Myers | 362/32 |
| 5,241,308 | 8/1993 | Young | 341/34 |
| 5,287,102 | 2/1994 | McKiel, Jr. | 340/825.19 |
| 5,300,926 | 4/1994 | Stoeckl | 345/157 |
| 5,307,086 | 4/1994 | Griffin, et al. | 345/146 |
| 5,384,577 | 1/1995 | McLaughlin, et al. | 345/102 |
| 5,396,226 | 3/1995 | Wake, et al. | 340/825.31 |
| 5,412,189 | 5/1995 | Cragun | 235/379 |
| 5,440,208 | 8/1995 | Uskali et al. | 315/169.3 |
| 5,521,596 | 5/1996 | Selker et al. | 341/22 |
| 5,598,527 | 1/1997 | Debrus et al. | 345/173 |
| 5,771,176 | 7/1998 | Froehlich et al. | 340/505 |
| 5,801,692 | 9/1998 | Muzio et al. | 345/339 |
| 5,841,428 | 11/1998 | Jaeger et al. | 345/184 |
| 5,889,672 | 3/1999 | Schuler et al. | 364/188 |
| 5,892,355 | 11/1999 | Jaeger et al. | 345/161 |
| 5,936,613 | 8/1999 | Jaeger et al. | 345/172 |
| 5,977,955 | 11/1999 | Jaeger | 345/172 |

Primary Examiner—Vijay Shankar
Assistant Examiner—Vanel Frenel
Attorney, Agent, or Firm—Kilpatrick Stockton LLP; George T. Marcou; James J. Bindseil

[57] ABSTRACT

Described is a user interface particularly suited for use in a home automation system. This interface combines advantages of a conventional touch screen (such as ease of use and accurate "key" placement) with the advantages of a conventional mechanical keypad (such as reduced cost and tactile feedback). The interface is well suited for use on any wallspace and may be easily reconfigured as necessary to support a host of system functions. The interface utilizes a backlit LCD separated into separate display sections, each having a durable, scratch resistant lens. Cantilevered switches associated with each display are used detect a user's selection of a displayed option.

36 Claims, 9 Drawing Sheets

USER INTERFACE FOR HOME AUTOMATION SYSTEM

FIELD OF THE INVENTION

This invention relates to an improved interface for interacting with a variety of electronically controlled systems and appliances. More particularly, the present invention relates to an improved touchscreen, particularly suited for use in residential or commercial automation systems, which provides a consistent, easy to use interface.

BACKGROUND OF THE INVENTION

In recent years, both the number and variety of electronic devices and appliances in use have increased dramatically. Lighting systems, personal computers (PCs), video tape recorders, compact disc (CD) players, stereo receivers, and televisions are but a few of the most common devices found n both residential and commercial settings. Even appliances which rely on non-electric power sources, such as gas burning furnaces, are usually controlled electronically.

Reflecting the variety of devices now available, many different systems and devices are used to provide more centralized or automated control of the appliances found in the home and the office. These can be as simple as a remote-control entertainment system comprising a CD player, stereo and television, or as complex as a building environmental control system for regulating HVAC and security functions.

A central feature of any automation system is the interface by which the user interacts with the automation system. User interfaces permit one to program future operation or to control different devices from a centralized location. Reflecting the variety of appliances or devices that are to be controlled, user interfaces may range widely in complexity. In some settings, a more complicated interface is necessary to provide the broad range of functionality required. For example, a building control center may be sufficiently complicated to require training for the operator. On the other hand, in many environments, particular residential settings, it is essential that interfaces be easy to use and understand so that the entire range of functionality may be utilized.

Unfortunately, the standard approach now commonly used is for each device or system in a given environment to be controlled according to a particular methodology which might differ dramatically from other systems. For example, a home might include a security system, an entertainment system, an environmental control system, and so forth, each with its own unique interface. Thus, a user may be required to set a thermostat in a first manner, program a VTR in a different manner, and program the security system in yet a different manner. By requiring the user to learn several methods of operating each system or set of devices in the environment, it is more difficult for the user to become familiar with the various systems and to take full advantage of all their features.

Another drawback associated with this standard approach is that the use of different interfaces may result in an increase in the amount of space taken up in the setting. For example, two or more different keypad controllers may be mounted on a wall to separately control individual systems. As a result, there may be a decrease in available wall space and a negative impact on the aesthetic quality of the setting.

Some automation systems attempt to address these limitations through the use of menu driven interfaces which are connected to a single, dedicated control processor. With such a system, a user may control various systems, such as lighting, HVAC, and security, from a single type of interface which uses a common methodology for interacting with the user. In general, such interfaces incorporate a display, typically a cathode ray tube (CRT) or liquid crystal display (LCD), which provides the user with several options for controlling one or more systems in the setting.

Different types of interfaces are used in menu driven systems. In some systems, a touch screen is utilized wherein the user presses a portion of the display screen to make a selection. The user's fingertouch is detected and the display indicates which area of the display has been selected. Alternatively, conventional mechanical switches may be provided in proximity to the display screen. A graphical image on the display device directs the user to the appropriate push-button flanking the display. This approach is similar to that adopted in connection with many automated teller machines (ATMs).

Touchscreens are advantageous in that the area in which the user is prompted to make a selection is usually identical to the region-which is actually acted upon by the user. For example, virtual buttons may be displayed which are selected on the same display area. On the other hand, touchscreens are relatively expensive and require a fair amount of support by processor and memory elements in order to function properly. Moreover, their use may not prove to be as convenient to the average user as more simple mechanical buttons which provide tactile feedback to the user, usually by a button which clicks when fully depressed.

The other above-mentioned approach of providing mechanical switches in proximity to a display screen overcomes these drawbacks, at least in part, in that the mechanical switches may provide tactile feedback. However, since the switches are offset from the display, this approach may require more care in use, particularly in comparison with a touchscreen. In particular, the offset between the switches and the display may make it difficult for a user to determine which button corresponds to a given option. As a result, the user may become disoriented and there may be a delay in the selection of a desired option as the user verifies which switch corresponds to the desired option. Such a delay is clearly unacceptable where the user is attempting to address certain high priority control systems, such as lighting systems or home security. Further, this problem may be exacerbated where the display screen contains more than a few simple commands. Thus, the combination display/push-button interface is limited by its nature in the amount of information that may be displayed and the command options that may be offered.

Accordingly, there is a need for an economical, menu-driven interface that permits the user to rapidly and efficiently select a desired function and enter a desired command. There is a related need for the interface to provide tactile feedback to signal the user that a command has in fact been entered.

SUMMARY OF THE INVENTION

It is an object of the invention to meet these needs and to overcome the above-describe shortcomings of conventional user interfaces.

It is a further object of the invention to provide a user interface which comprises: a liquid crystal display divided into a plurality of regions;
a microcontroller operatively coupled to a host controller, the microcontroller driving the liquid crystal display according to signals received from the host controller so as to display text or images on each of the plurality of regions of the liquid crystal display; a transparent member covering each of the regions of the liquid crystal display; and a plurality of switch elements disposed proximal to the regions of the liquid crystal display, each of the switch elements being actuated by the transparent member covering it when the transparent member is depressed by a user; wherein the microcontroller detects actuation of the switch elements and provides an indication to the host controller in response thereto.

According to one feature of the invention, the user interface further comprises a plurality of light emitting diodes, each disposed proximal to each region of the liquid crystal display, the light emitting diodes being operated by the microcontroller. Optionally, these light emitting diodes are multicolored so as to be indicative of several system states.

According to another feature of the invention, the liquid crystal display is backlit. A light sensor coupled to the microcontroller is used to regulate the intensity of the backlighting of the liquid crystal display depending on the intensity of ambient light detected with the light sensor.

According to another feature of the invention, wherein the transparent member covering the liquid crystal display is made of a scratch resistant, durable material, such as Lexan.

According to still another feature of the invention, the liquid crystal display and the microcontroller are mounted on a printed circuit board which, in turn, is mounted to a wall mounted electrical box. A faceplate is applied to the face of the transparent overlay so as to cover the fasteners which affix assembly to the electrical box.

According to yet another feature of the invention, the host controller provides instructions to the microcontroller whereby a menu of options are displayed on the liquid crystal display to the user. The user indicates selection of a displayed option by depressing the transparent member over the corresponding region of the liquid crystal display.

Additional objects and features of the invention will be apparent from the detailed description of the preferred embodiments set forth below.

DETAILED DESCRIPTION OF THE PREFERRED EMBODIMENT

Preferred embodiments of the invention are now described in reference to the accompanying drawings. FIGS. 1 to 6 illustrate the physical construction of one embodiment of the interface according to the invention. The remaining drawings illustrate the functional aspects of this embodiment of the invention.

As described in detail below, the user interface 2 according to the preferred embodiment principally comprises the following components: a printed circuit board (PCB) 34; a transparent overlay 22; and a faceplate 38. The electronic components of the user interface are mounted to the PCB 34, either directly or by mounting on the reverse side of the PCB 34. The transparent overlay 22 is fastened to the PCB 34 and the combined unit 2 is then mounted in a standard electrical box, such as a three gang box. The faceplate 38 is then applied over the face of the interface to cover the screwheads and to provide a seamless appearance.

Figure 1A:
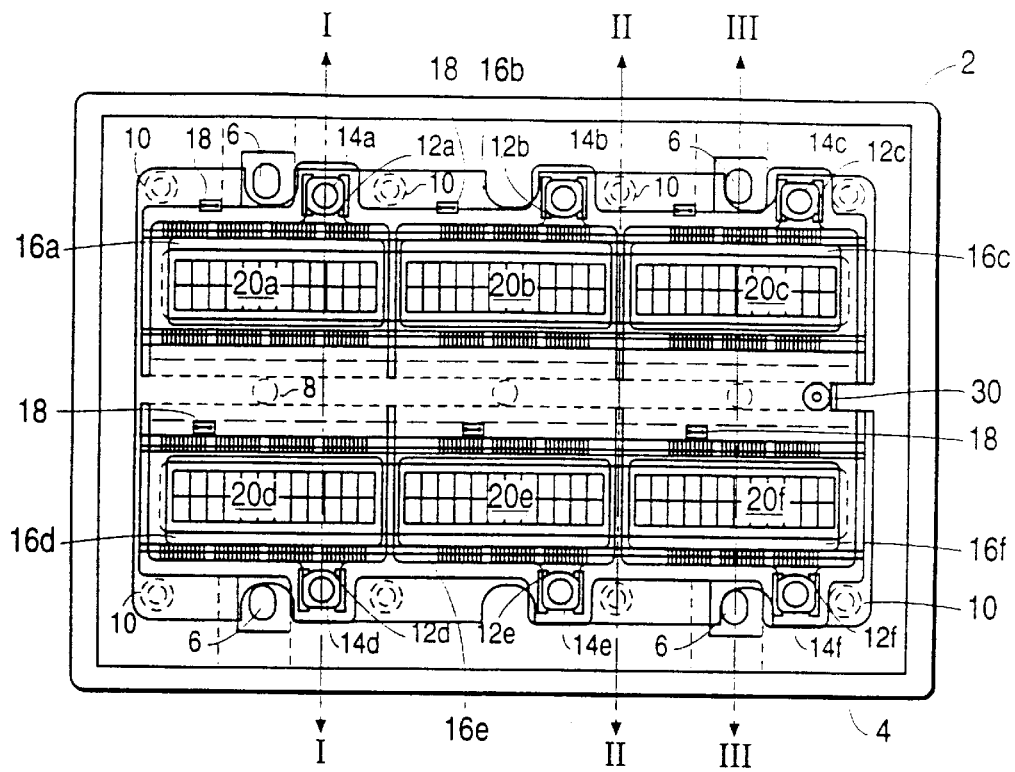
FIG. 1A is a front plan view of a printed circuit board and overlay for a user interface in accordance with an embodiment of the invention.
Figure 1B:
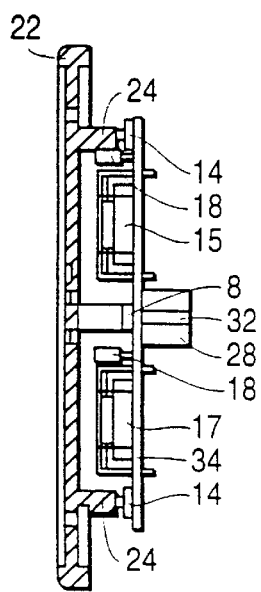
FIGS. 1B–1D are respective cross-sectional views of the interface of FIG. 1A taken, respectively along lines I—I, II—II, and III—III.
Figure 1C:
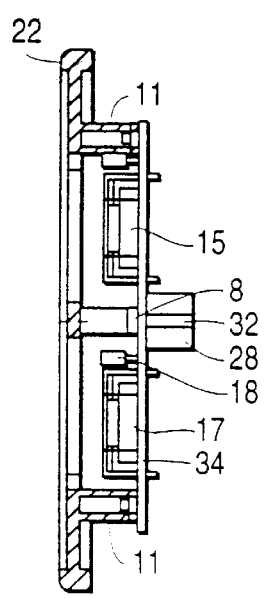
Figure 1D:
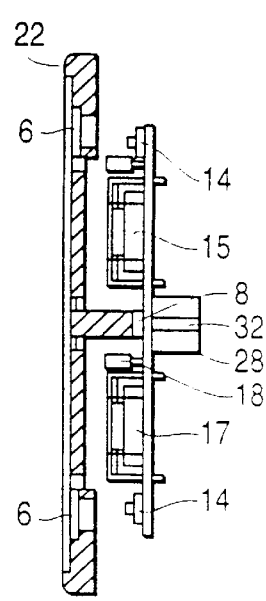

FIG. 1A is a front plan view of the PCB 34 with the transparent overlay 22 attached thereto. FIGS. 1B to 1D are respective cross-sectional view taken respectively along lines I—I, II—II, and III—III in FIG. 1A. Various electronic components are disposed on the front side of the PCB 34. These include two liquid crystal display (LCD) modules (an upper module 15 and a lower module 17) which are each segmented into three display areas so as to provide six display surfaces 20a–20f. In proximity to each of the six display surfaces 20a–20f are respective microswitches 14a–14f and indicator light emitting diodes (LEDs) 18. An optional photosensor 30 is disposed between two of the display portions 14c and 14f.

As explained below, the indicator LEDs 18 serve to provide visual feedback in response to user input and provide an indication of system status. Preferably, bicolored LEDs (red and green) are utilized which can be actuated to produce indications of various states. The indicator LEDs 18 can be turned on, off, or blink. In the on or blinking state, the LEDs 18 can emit a red light, a green light, and also an amber light by lighting the LED both green and red simultaneously. Thus the indicator LEDs 18 are capable of displaying up to seven states (off, solid red, solid green, solid amber, blinking red, blinking green, blinking amber).

In this example, each of the two LCD modules 15 and 17 have displays which are two characters high by forty characters wide. As described below, each display is segmented into through regions, resulting in the loss of six characters per LCD. As a result, each virtual button that is displayed at regions 20a–20f has a display area which is twelve characters wide by two characters high, thus providing a total of twenty-four possible characters for display. This segmentation economically increases the number of apparent discrete displays, even though only two discrete modules are actually utilized.

In the preferred embodiment, the six display regions 20a–20f of the LCDs are individually backlit by a corresponding set of LEDs to provide enhanced visibility to the user. During times when the ambient background light is relatively high, it is necessary that the backlighting be relatively intense so that the display may be seen. When the ambient light is low, it is preferred that the backlighting be sufficient to illuminate the LCDs but relatively low enough so as not to be distracting. According to one variation of the invention, an optional photosensor 30 is provided on the face of the PCB to detect when the ambient light has fallen below a predetermined threshold, thereby indicating to the microcontroller that the backlighting should be decreased. According to a second variation, the microcontroller may simply be programmed to maintain the backlighting at a low level until the virtual keypad is activated by the user, and then return to a low level after a predetermined time has elapsed.

It is a further feature of the invention that the LEDs used to backlight the LCDs may be individually controlled at each of the display regions 20a–20f. It is thus possible to selectively turn on and off various "virtual buttons" displayed at regions 20a–20f by means of appropriate programming.

As best seen in FIG. 1A, the transparent overlay 22 is attached to the PCB 34 with eight fasteners 10 (screws in this example). The fasteners 10 extend through respective hollow bevels 11 which extend from the surface of the PCB 34 and through vias in the PCB 34 (see FIG. 1A and 1C). The bevels 11 and four center supports 8 maintain the transparent-overlay 22 at a fixed distance from the surface of the LCD display portions 20a–20f. As best seen in the cross-sectional views of FIGS. 1C and 1D, the LCDs 15 are disposed between the center supports 8 and the bevels 11 so that the front surfaces 20a–20f of the LCDs are covered entirely by the transparent overlay 22.

The transparent overlay provides six separate touch areas 16a–16f which cover, respectively, the display surfaces 20a–20f. Each of these touch areas 16a–16f are connected via a rectangular portion 12a–12f to a post 24 which extends to just above a corresponding microswitch 14a–14f associated with one of the display surfaces 20a–20f. When the pressure is applied to any of the touch areas 16a–16f, a post 24 is consequently pushed down onto a corresponding one of the microswitches 14a–14f. Thus, the touch areas 16a–16f of the transparent overlay 22 act as cantilevers which activate a corresponding switch 14a14 14f associated with one of the display surfaces 20a–20f. The microswitches 14a–14f provide tactile feedback to the user through the posts 24 that are coupled to the touch areas 16a–16f.

Once the transparent overlay 22 is fastened to the PCB 34 (and its associated controller board described below), the resulting assembly is mounted within a standard three gang box (not shown). The assembly is mounted through four oval shaped openings 6 provided on the transparent overlay 10 (as best seen in FIGS. 1A and 1D). These openings 6 are disposed in recesses in the front surface of the overlay 10 so as to be disposed over four of the six screw mounts of the three gang box (not shown). Unlike conventional components that are normally mounted in three gang boxes, oval openings 6 are utilized to permit adjustment of the interface 2 to compensate for any misalignment of the three gang box. The recesses for the oval-shaped openings 6 prevent bulging when the surface of the overlay is covered with the faceplate as described below.

While not shown, the assembled interface 2 according to the preferred embodiment is coupled to a network, such as a home automation system through communication lines and a power line provided to the three gang box. Preferably, conventional twenty gauge wire 14 is utilized to permit standard RS45 communication between the interface and the host processor of the home automation network.

Figure 2A:
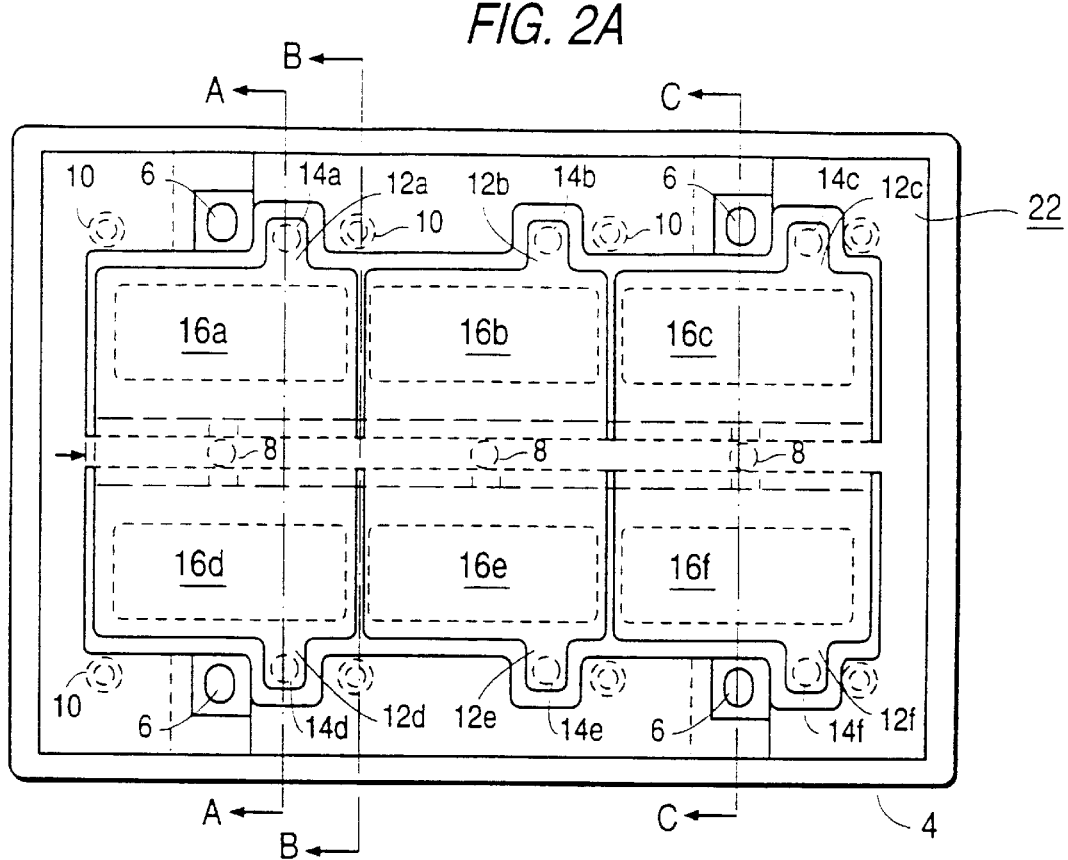
FIG. 2A is a front plan view of a transparent overlay in accordance with an embodiment of the invention.
Figure 2B:
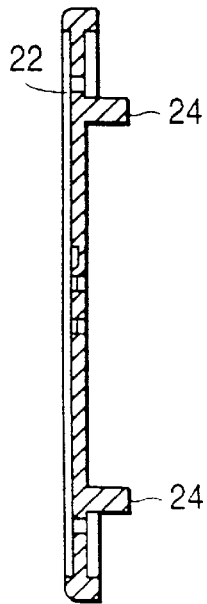
FIGS. 2B–2D are respective cross-sectional views of the transparent of FIG. 2A taken along lines A—A, B—B, and C—C.
Figure 2C:
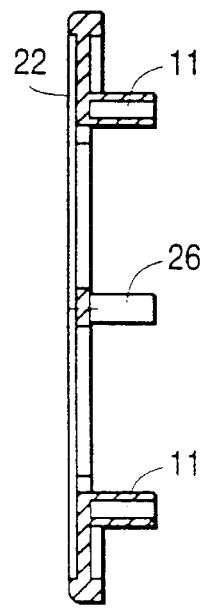
Figure 2D:
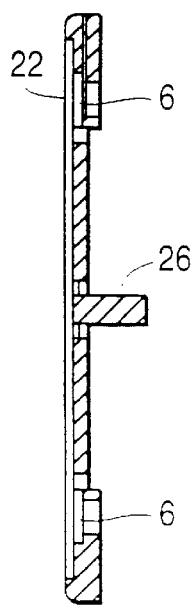

FIG. 2A is a front plan view of the transparent overlay 22. FIGS. 2B to 2D are respective cross-sectional views of the transparent overlay 22 taken, respectively, along lines A—A, B—B, and C—C.

In this example, the transparent overlay 22 preferably comprises a resilient, scratch-resistant material, such as polycarbonate GE (generally known as "LEXAN"). While in the preferred embodiment the transparent overlay 22 comprises a single piece, it is designed to provide six touch areas 16a–16f, which in effect serve as respective clear plastic lenses over the display regions 20a–20f. Each touch area 16a–16f is associated with a post 24 by which the above-mentioned microswitches are activated when any of the touch areas 16a–16f are depressed.

Figure 3:
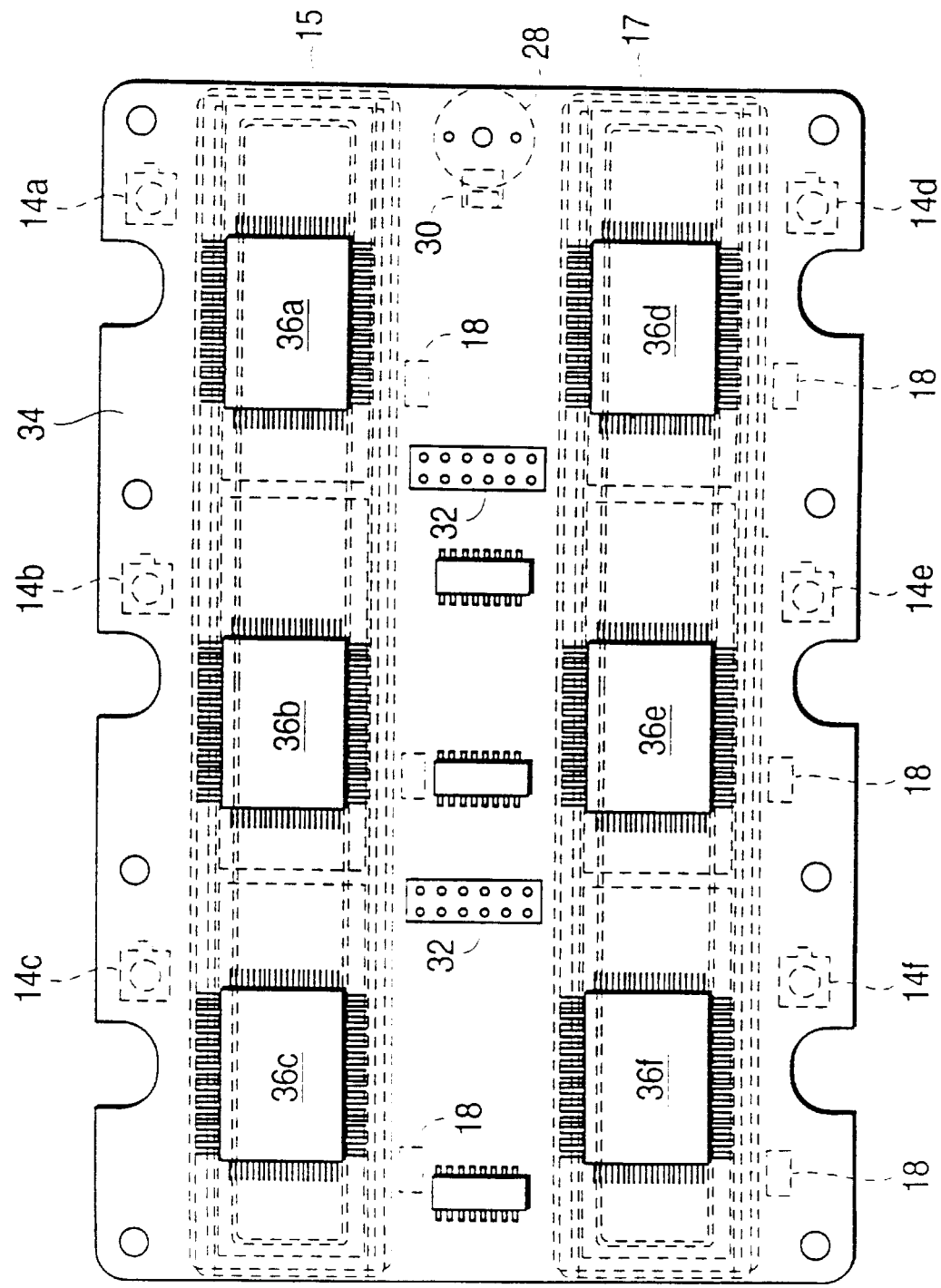
FIG. 3 is a back plan view of the printed circuit board of FIGS. 1A–1D.

FIG. 3 is a plan view of the rear surface of the PCB 34. As shown, the integrated circuits provided on the rear surface of the PCB include respective driver chips 36a–36f which are connected to the LCDs 15 and 17 and the backlight LEDs. Also mounted on the rear surface of the PCB 34 is a buzzer 28. The buzzer 28 provide audio feedback for a variety of situations. For example, it can be actuate to provide a clicking sound each time one of the microswitches 14a–14f are actuated to provide audio feedback confirming that a touch has resulting in selection of an option. It also may be used to signal an alarm, for example, to indicate that a security system be disarmed in order to avoid sounding an alarm.

The PCB 34 is also provided with two sockets 32 adapted to receive a processor card. While not shown in FIG. 3, this card preferably matches the footprint of the PCB 34 and is disposed parallel to thereto. A relatively inexpensive, standard eight bit microcontroller is disposed on the processor card. As explained below, the functions of the microcontroller include: communicating with the network host controller; controlling the indicator LEDs 18; receiving ambient light level signals from the optional photosensor 30; controlling the backlight LEDs associated with each virtual button; controlling the display drivers which in turn control the LCDs; detecting actuation of the microswitches 26; and actuating the buzzer 28.

Associated with the microcontroller is flash read only memory (ROM) in which the firmware for basic level functions executed by the microcontroller is written. As known in the art, the use of flash ROM permits in circuit reprogramming of the microcontroller without the necessity of physically removing components from the circuit board.

Figure 4:
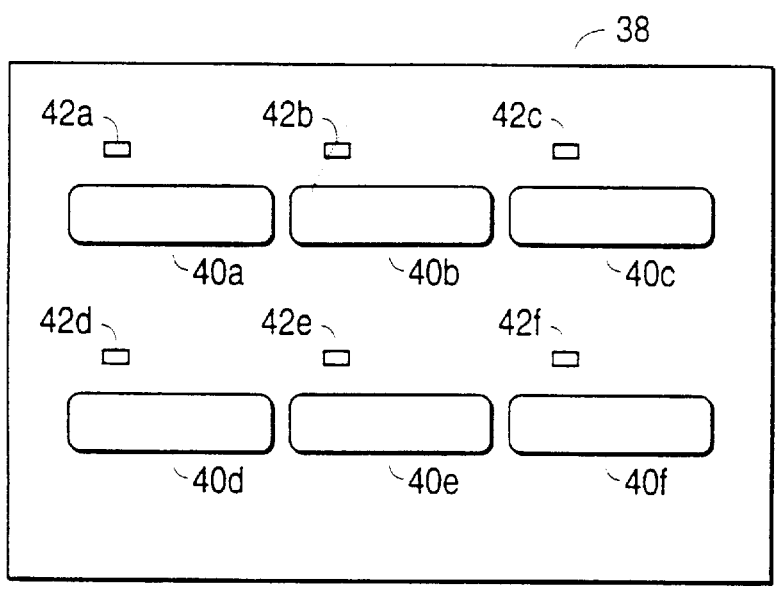
FIG. 4 is a front plan view of a faceplate in accordance with an embodiment of the invention.

FIG. 4 is a front plan view of a faceplate 38 which covers the front surface of the assembled interface 2 once it has been mounted to a wall surface. In the preferred embodiment of the invention, the faceplate comprises a silk screen or painted surface having six openings 40a–40f adapted to fit over the touch areas 16a14 16f. In this way, the faceplate 38 covers the screwheads which affix the interface to the three gang box so as to provide an aesthetically pleasing, seamless appearance. In a more functional respect, the faceplate clearly defines the touch areas 16a–16f by covering the unused portions of the LCDs 15 and 17 as described above. It thus creates the impression of what is referred to herein as "virtual buttons" each having text or other images displayed thereon.

The faceplate further includes six transparent or translucent openings 42a–42f. These openings are disposed in alignment with the indicator LEDs 18 referred to above. For aesthetic purposes, it is preferable that the openings be translucent to such a degree that the LEDs 18 are visible when lit, and not visible when unlit.

Figure 5:
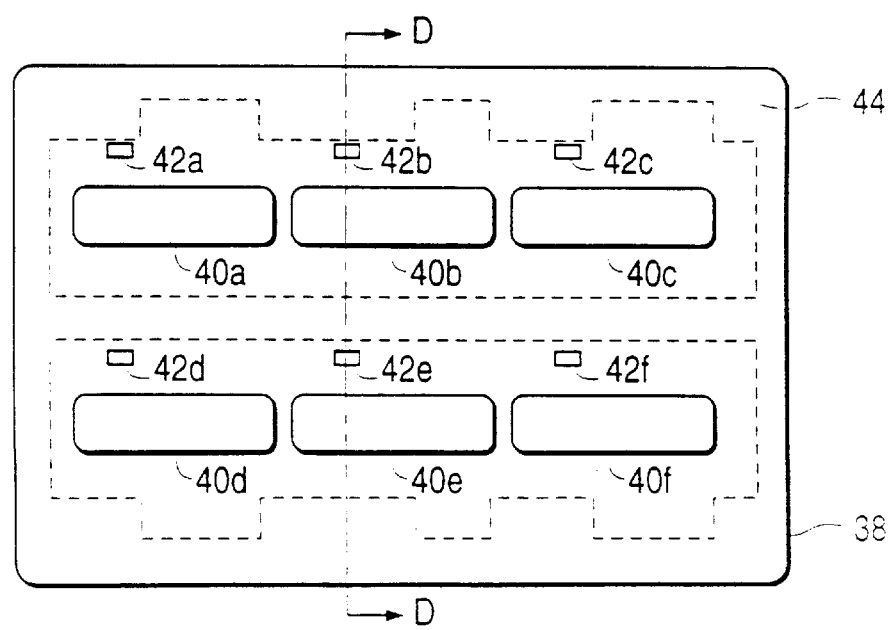
FIG. 5 is a front plan view of the faceplate of FIG. 4 showing an adhesive layer applied thereto.

As illustrated in FIG. 5, it is preferred that the faceplate be applied to the surface of the transparent overlay 22 with an adhesive 44. In this way, no fasteners are visible which would interfere with the aesthetic features of the interface.

Figure 6:
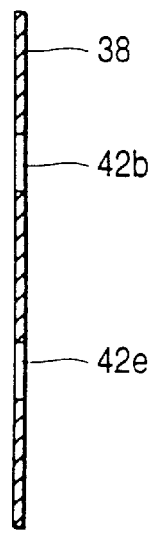
FIG. 6 is a cross-sectional view of the faceplate of FIG. 5 taken along line D—D.

FIG. 6 is a cross-sectional view of the faceplate 38 taken along a line D—D in FIG. 5. This view illustrates the openings 42b and 42e which are provided in the faceplate 38.

From the foregoing description, it should be apparent that the interface according to the preferred embodiment provides several advantages through its unique design. For example, the cantilevered switches associated with the "virtual buttons" formed below the touch regions of the interface provides sensory feedback, both aural feedback with the buzzer and tactile feedback with the microswitches. The LCDs provide a means for displaying an unlimited number of alphanumeric messages in an economical manner. The use of associated indicator LEDs provide yet another simple, but effective means of conveying information to a user, such as system status.

It will be appreciated that the interface according to the invention can be applied in a large number of environments. By way of illustration, application of the interface in a home automation system is now described in reference to FIGS. 7 to 11.

Figure 7:
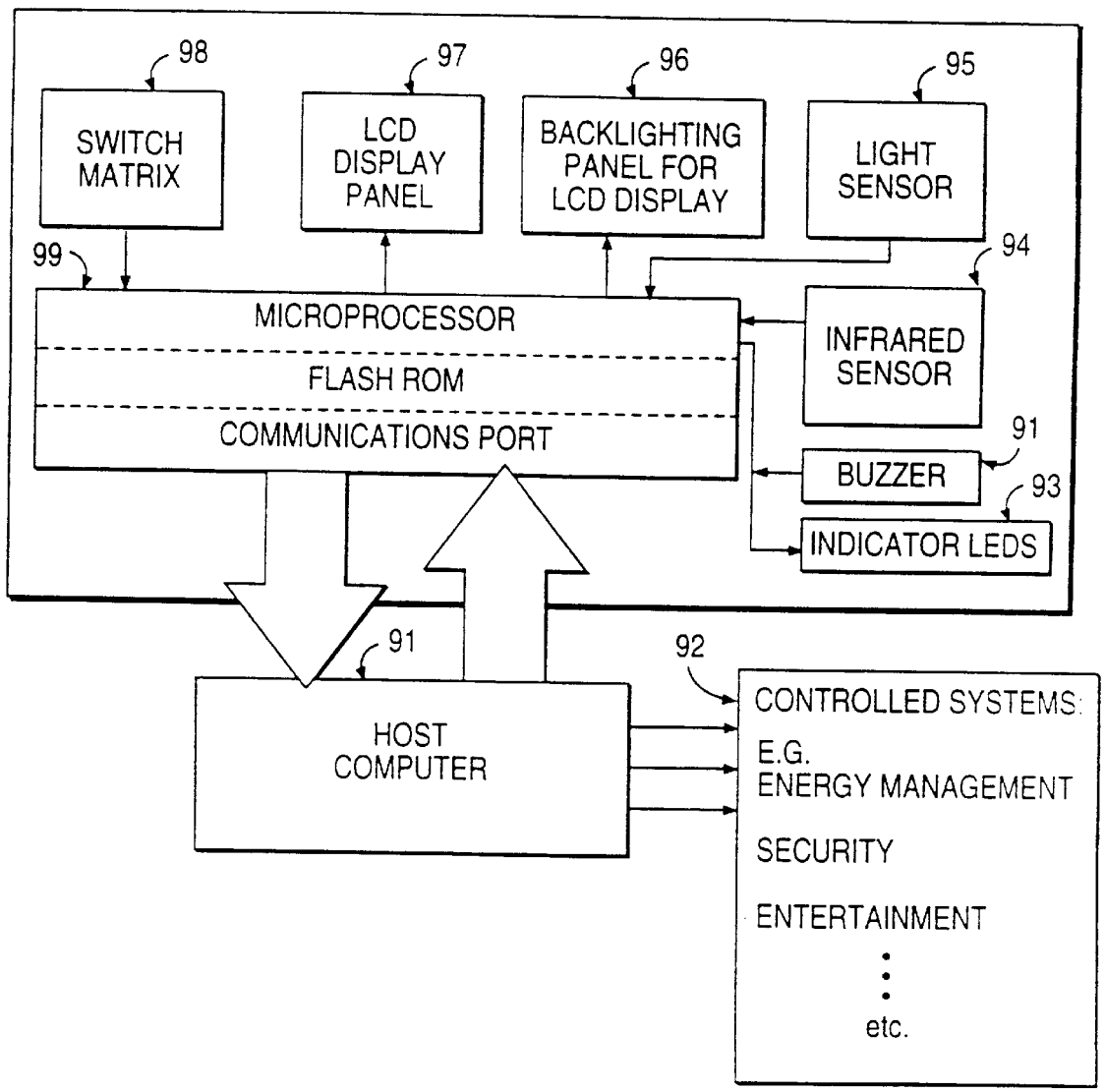
FIG. 7 is a block diagram illustrating the functional aspects of an interface in accordance with the invention.

FIG. 7 is a block diagram of the functional interaction between the microcontroller 99 and the above identified components of the interface according to the preferred embodiment. As shown, the microcontroller 99 receives signals from the mechanical switches 98, light sensor 95, and optional infrared sensor 94. In turn, the microcontroller 99 provides appropriate signals to control the LCDs 97, the backlighting panel for the LCDs 96, the LED indicators 93, and the buzzer 91.

The microcontroller 99 communicates with a host computer 91 through a communications port. As noted above, the preferred embodiment utilizes an RS45 communication system. Of course, other means of communication are possible.

Based on signals received from the host processor, the microcontroller 99 displays information to the user through the LED indicators 93 and the LCD panel 97. User input, detected with the cantilevered switch arrangement noted above, is then provided to the host computer.

Based on this user input, the host computer controls various systems 92 connected to the network. As noted above, these controlled systems may include an energy management system, a security system, an entertainment system, or various other systems.

It will be appreciated that the programming for control of user interface and the systems attached to the system principally lies with the host computer. In fact, it is preferred that the user interface utilize a relatively simple microcontroller having sufficient memory and firmware to control basic functions, such as turning on and off the LED indicators and pixels of the LCDs as instructed by the host computer. While it is possible to utilize a more expensive microcontroller, it is preferred to maintain most processing at the host level so as to reduce cost.

Maintaining most processing at the host level further simplifies any necessary programming revisions since changes can be per-formed centrally, rather than with each interface. As indicated above, should the need arise to alter the firmware resident at the interface level, flash ROM is utilized so that changes may be made without physically removing ICs from the PCB.

Figure 8:
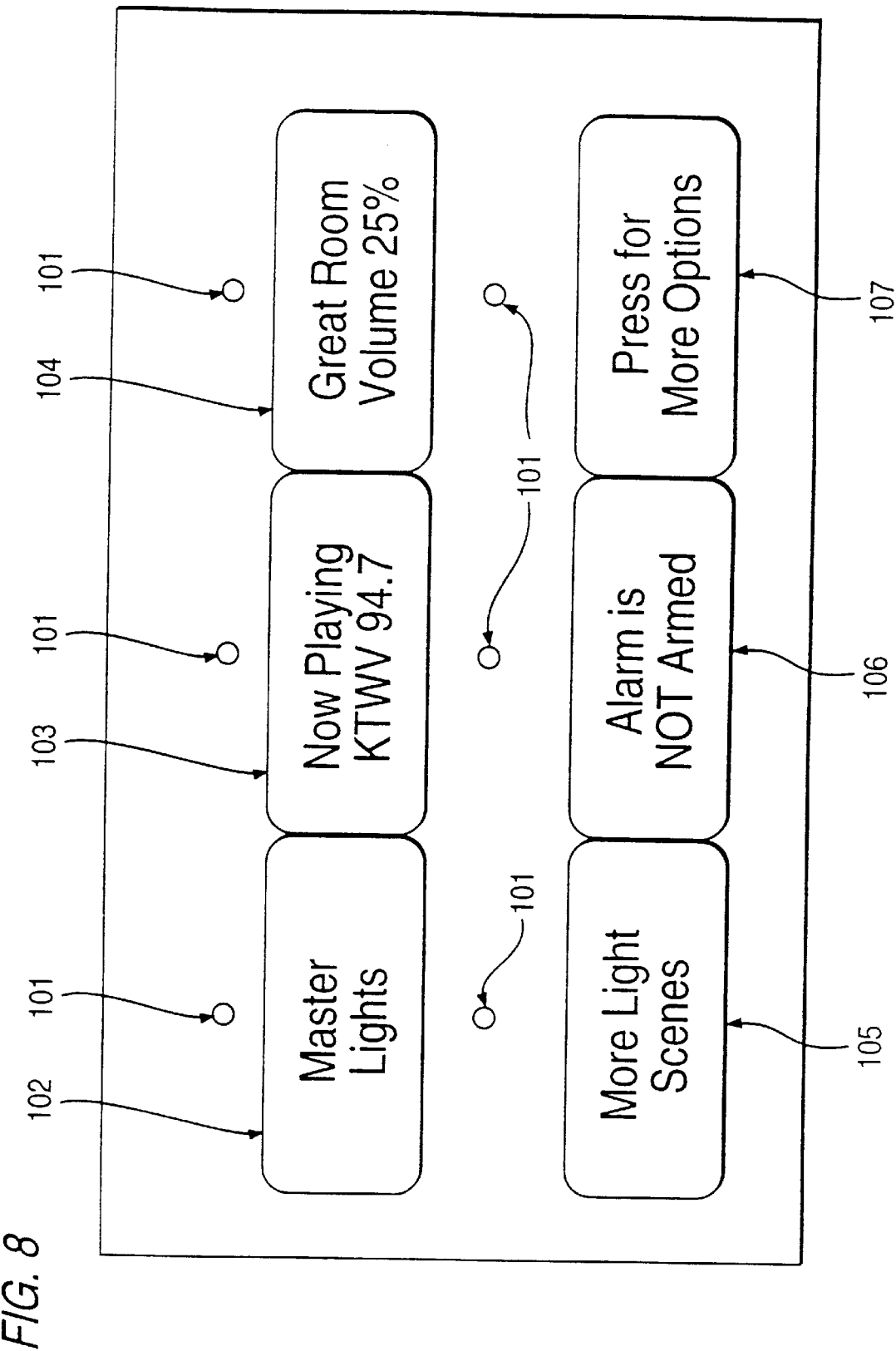
FIGS. 8 to 11 are illustrations of various virtual keypads displayed in a menu driven hierarchy.

FIG. 8 illustrates an example of the a menu driven virtual keypad display as it appears in the preferred embodiment of the present invention. Preferably, the virtual keypad is designed so that six touch actuated transparent "keys" are superimposed over the LCD display 40 to form a display "page". Information is displayed in each of the six LCD display fields corresponding to a function that is controlled by the host computer. Certain controlled functions may be grouped to form a "menu" according to their level of priority or relatedness. Further, indicator LEDs 101, located proximal to each key, signal the user that a status change in a controlled function has occurred.

In the example illustrated in FIG. 8, the displayed information collectively forms a preconfigured "default menu," wherein information relevant to five high priority home control functions 102–105 are displayed concurrently with a "press for more options" key 107. A hierarchy of menus describing the various systems and subsystems controlled by the host computer may be accessed by actuating the "press for more options" key 107.

In this example, depressing the area over the "Master Lights" virtual key 102 actuates a corresponding mechanical switch through the cantilever action described above. This is detected by the microcontroller, which sends a corresponding signal to the host computer. In response, the host computer may energize/de-energize a preestablished configuration of room lighting.

Actuating the "More Light Scenes" 105 key displays a preconfigured sub-system menu (not shown) wherein alternative lighting patterns may be controlled (e.g., pool lighting; front outside lighting; back outside lighting, etc.). The "Now Playing KTWV 94.7" key 103 displays the current channel setting on a radio receiver. Actuating this key displays a sub-menu illustrated in FIG. 9, wherein alternate preestablished radio station settings may be accessed or alternate menus configured to control different entertainment systems may be displayed (e.g., compact audio disc player, tape player, laser disc, television, video cassette player, etc.).

The "Alarm is NOT Armed" key 106 displays the current status of the home alarm system. Depressing this key accesses an alarm system sub-menu illustrated in FIG. 12 for controlling various alarm system functions. The "Great Room Volume 2%" key 104 displays the current audio volume setting for speakers located in the great room. Depressing this key accesses the great room audio volume control sub-menu illustrated in FIG. 11 by which various audio functions may be controlled (e.g., volume up, volume down, mute, audio power off, etc.). Depressing the "Press for More Options" key 42 accesses alternative preconfigured sub-menus (not shown).

Figure 9:
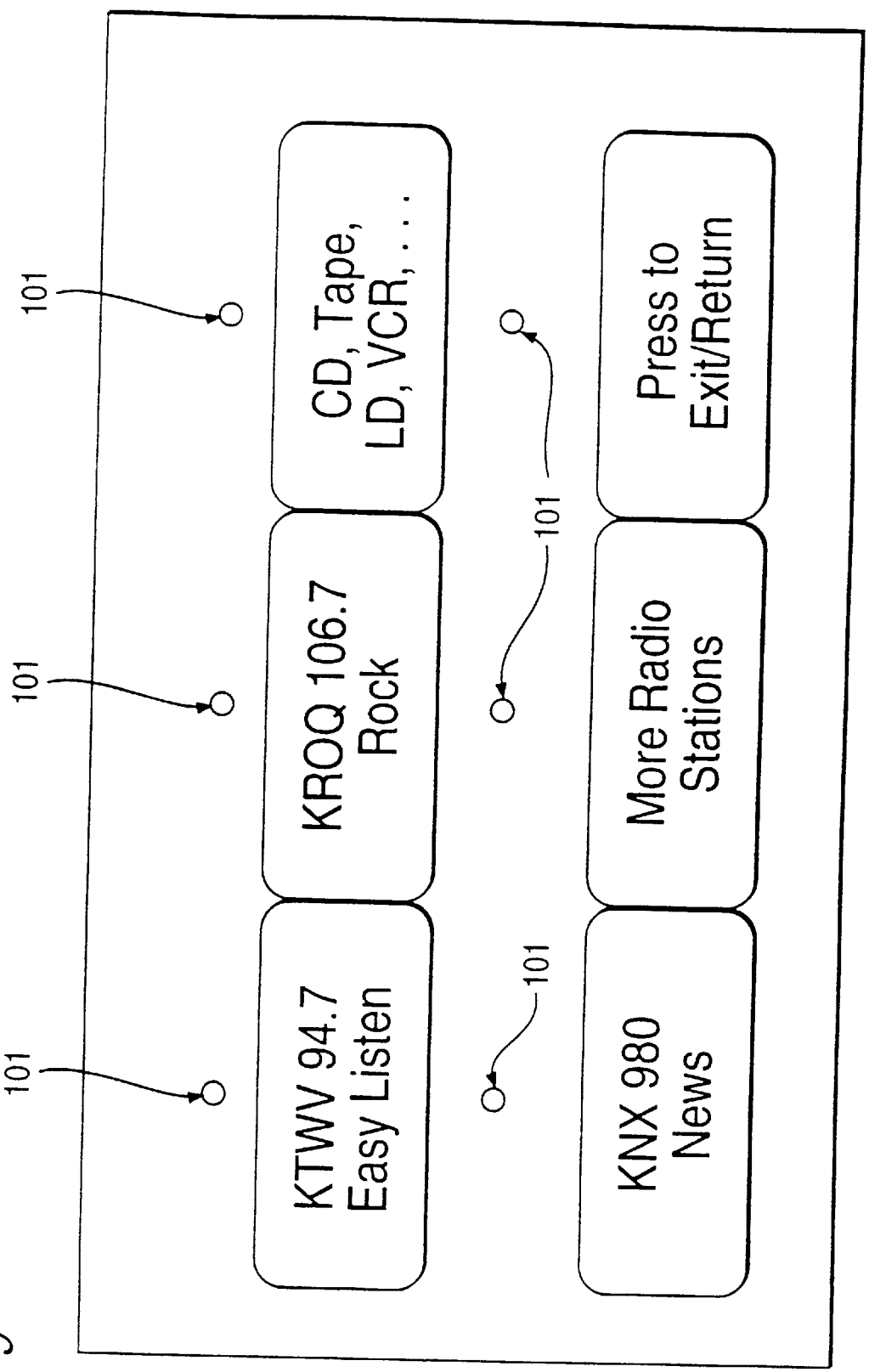
Figure 10:
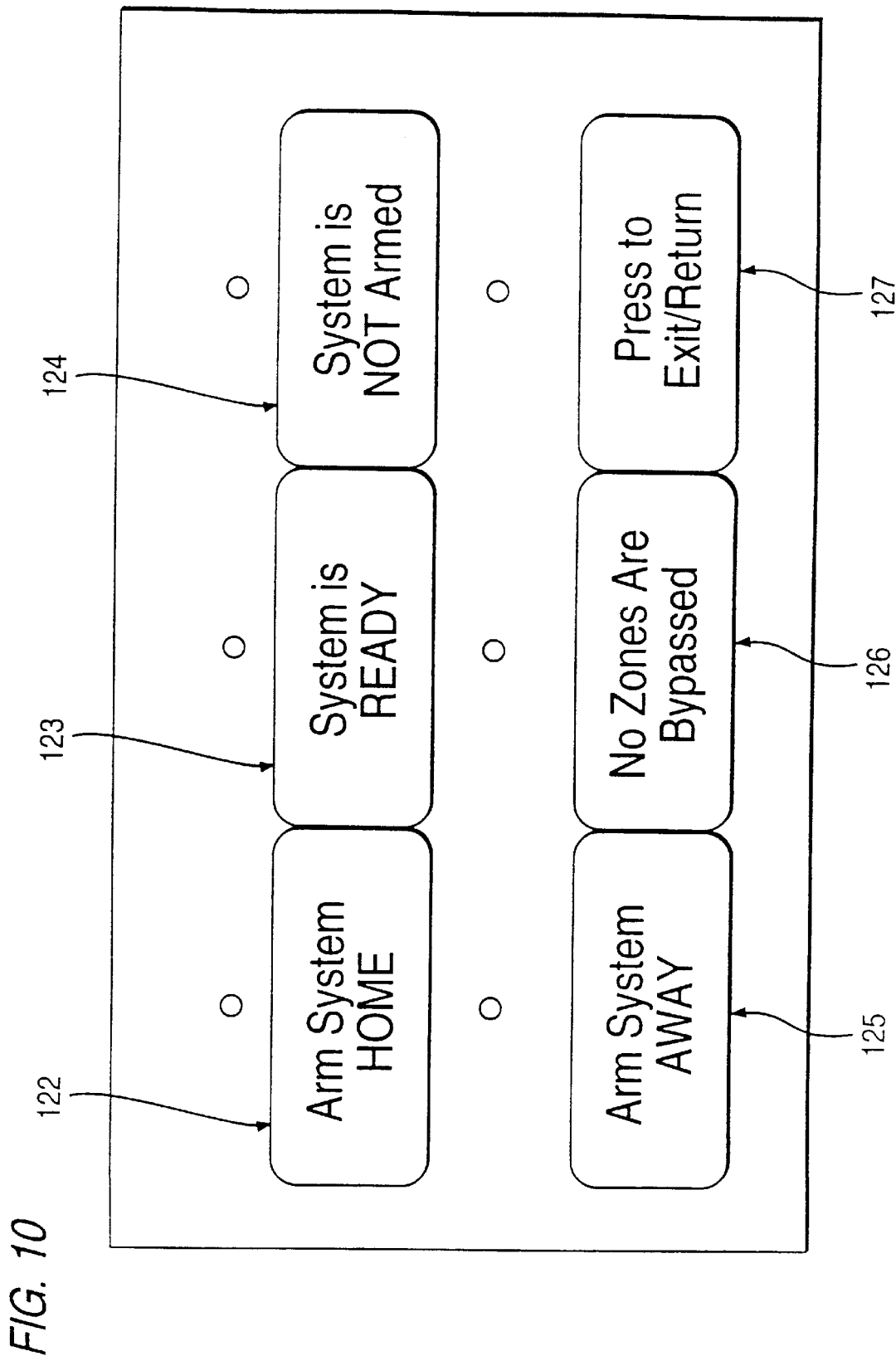

FIG. 9 illustrates an example of an alarm system sub-menu as it may appear on the keypad display after depressing the "Alarm is NOT Armed" key 106 in FIG. 8. Referring to FIG. 10, the alarm system sub-menu displays on the keypad display five functions 122–126 and a "Press to Exit/Return" function 127 The "Press to Exit/Return" key 127 returns the user to the default menu from the sub-system menu as illustrated in FIG. 10.

Figure 11:
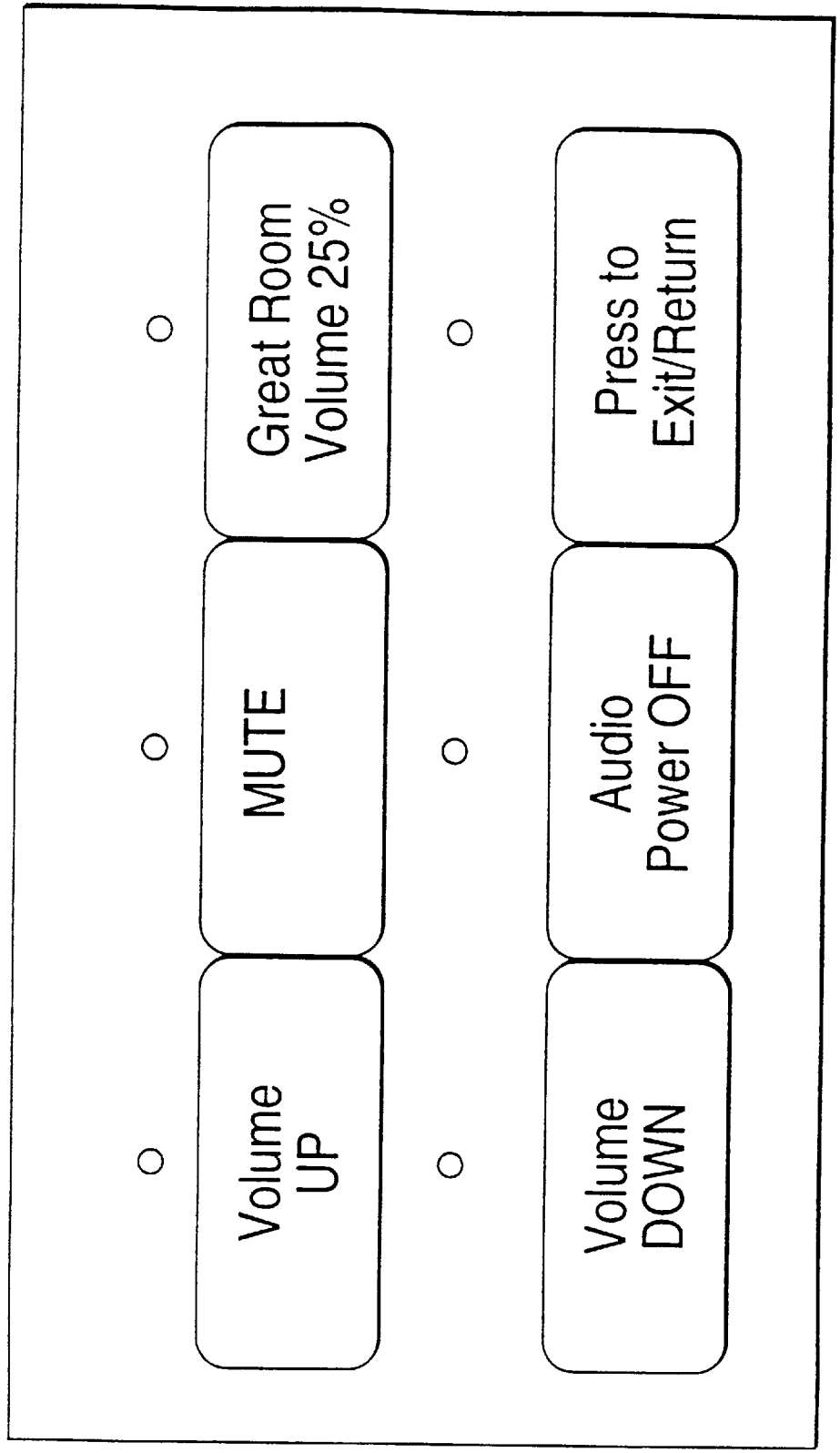

The functions displayed on the default menu illustrated in FIG. 8 and the various sub-menus illustrated in FIGS. 9–11 may be optimized for an individual user's application to provide instant access to the most frequently used functions, including high —priority home control functions such as security or lighting. According to the preferred embodiment of the invention, the upper left key of the default menu displays the main lighting scene, and the lower right key displays a "Press For More Options" to access subsequent menus. The invention is also designed so that the default menu will be displayed after a preset time-out period.

The default menu also provides access to all functions and subsystems that do not appear on the default menu. In the preferred embodiment of the present invention, if more than five subsystems are being controlled, four subsystems will be displayed on the main menu and additional subsystems can be accessed by pressing the "Press for More Options" key.

It will be apparent that the number of systems that can be accessed by the invention is not limited by its design. According to the preferred embodiment of the invention, subsystem menus may provide up to five functions on one display page, or four functions with a "Press for More Options" key to access additional subsystem functions. Thus, a very large number of subsystems may be accessed using the present invention.

The invention has been now been described in fulfillment of the above noted objects. Specifically, a user interface has been described which is particularly suited for use in a home automation system. This interface combines advantages of a conventional touch screen (such as ease of use and accurate "key" placement) with the advantages of a conventional mechanical keypad (such as reduced cost and tactile feedback).

While the invention has been specifically described with reference to particular aspects, features, and embodiments thereof in relation to its preferred embodiment as a keypad interface for a home control system, other variations, modifications, and alternate embodiments will be apparent to those skilled in the art. It is intended that such variations, modifications and alternate embodiments are to be regarded as being within scope of the invention.

What is claimed is:

1. A user interface, comprising:
    a liquid crystal display divided into a plurality of regions;
    a microcontroller operatively coupleable to a host controller, the microcontroller driving the liquid crystal display according to signals received from the host controller so as to display text or images on each of the plurality of regions of the liquid crystal display;
    a plurality of transparent keys, each of the keys overlying a corresponding one of the regions of the liquid crystal display, each of the key defining a separate tactilely-distinguishable touch area, and each of the keys being independently cantileverable;
    a plurality of mechanical switch elements disposed proximal to the regions of the liquid crystal display, each of the switch elements being engageable by one of the keys and providing positive tactile and aural feedback when the key is depressed and released; and
    wherein the microcontroller detects actuation of the switch elements and provides an indication to the host controller in response thereto.

2. The user interface according to claim 1, further comprising a plurality of light emitting diodes, each of the plurality of light emitting diodes being disposed proximal to one of the plurality of regions of the liquid crystal display, the light emitting diodes being operated by the microcontroller.

3. The user interface according to claim 2, wherein the light emitting diodes are multicolored.

4. The user interface according to claim 2, wherein the microcontroller operates the light emitting diodes on the basis of signals received from the host computer.

5. The user interface according to claim 1, wherein the liquid crystal display is backlit.

6. The user interface according to claim 5, further comprising a light sensor coupled to the microcontroller, the microcontroller regulating the intensity of the backlighting of the liquid crystal display depending on the intensity of ambient light detected with the light sensor.

7. The user interface according to claim 5, wherein predetermined regions of the liquid crystal display are backlit by separately controlled light emitting diodes, whereby selected portions of the liquid crystal display are operated independent of other portions.

8. The user interface according to claim 1, wherein each key comprises polycarbonate.

9. The user interface according to claim 1, further comprising a printed circuit board adapted for mounting the liquid crystal display and the keys, and the printed circuit board coupleable to the microcontroller.

10. The user interface according to claim 9, further comprising a single transparent member having a central portion and including each of the keys, wherein the central portion is supported by the printed circuit board, and wherein each key is cantileverable from the central portion to engage the corresponding one of the plurality of switch elements.

11. The user interface of claim 10, wherein the transparent member includes all integrated hinge molding for each of the plurality of keys.

12. The user interface of claim 11, wherein each of the plurality of touch areas is movable from a first position to a second position, such that each of the plurality of touch areas is depressed in the second position, and wherein each of the plurality of touch areas is biased by the hinge molding to the first position.

13. The user interface according to claim 1, further comprising a face plate having a plurality of openings further defining the tactilely-distinguishable touch areas.

14. The user interface of claim 13, wherein each of the plurality of touch areas has an extending height, wherein the face plate has an edge extending height, and wherein the tactile feedback includes a difference in height between the extending height of the plurality of touch areas and the edge extending height of the face plate.

15. The user interface of claim 1, wherein the host controller provides instructions to the microcontroller, whereby a menu of options are displayed on the liquid crystal display.

16. The user interface according to claim 15, wherein a selection of a displayed option is effected by depressing the key over the corresponding region of the liquid crystal display.

17. The user interface of claim 1, wherein the host controller is operatively coupled to at least one of a security system, a light control system, an energy management system, an entertainment system, and a speaker system.

18. The user interface of claim 1, wherein each of the switch elements are actuated by an extension extending from one from the plurality of touch areas.

19. The user interface of claim 1, further comprising a plurality of posts, wherein each of the switch elements is actuated by one from the plurality of keys via one from the plurality of posts when the key is depressed.

20. The user interface of claim 19, wherein each of the touch areas is connected to one from the plurality of posts.

21. The user interface of claim 1, wherein each of the touch areas tactile transmits the tactile feedback of the actuation of one of the plurality of the switch elements to a user.

22. The user interface of claim 21, wherein the feedback of the actuation of each one of the plurality of switch elements includes a mechanical click.

23. A method of actuating a user interface, comprising:
    receiving a pressure application at one of a plurality of transparent keys, each of the keys overlying a corresponding one of a plurality of region of a liquid crystal display, each of the keys defining a separate tactilely-distinguishable touch area, each of the keys being independently cantileverable;
    the pressure application cantilevering the one from the plurality of keys;

the cantilevered one from the plurality of keys engaging one from a plurality of switch elements, each of the switch elements disposed proximal to a corresponding one of the plurality of regions of the liquid crystal display, and each of the switch elements operatively cooled to a microprocessor, and the engaged one from the plurality of switch elements transmitting a signal to the microprocessor.

24. A user interface, comprising:

a display having a plurality of display regions each for generating images;

a plurality of switch elements each having a first position and a second position, wherein the switch is depressable to change between the first and second positions, and wherein each of the plurality of switch elements provides a first tactile feedback to positively indicate the first position and a second tactile feedback to positively indicate the second position; and a plurality of transparent keys defining a corresponding plurality of touch areas each corresponding to and covering one of the plurality of display regions, wherein each of the plurality of keys is independently cantileverable and engageable with one of the plurality of switch elements to cause the change between the first and second positions and to transmit the first and second tactile feedback to a user.

25. The user interface of claim 24, wherein each of the plurality of switch elements further provides a first and second aural feedback, corresponding to the first and second tactile feedback, to positively indicate the first and second positions, respectively.

26. The user interface of claim 24, wherein the display has a display surface and at least one side, and wherein the plurality of switch elements are positioned off of the display surface and adjacent to the at least one side.

27. The user interface of claim 24, further comprising a plurality of post elements each disposed between each of the plurality of keys and each of the plurality of switch elements.

28. The user interface of claim 27, wherein each one of the plurality of post elements is moveable by the corresponding one of the plurality of keys to cause the change between the first and second positions, and wherein each of the plurality of post elements transmits the respective first and second tactile feedback from the corresponding one of the plurality of switch elements to the corresponding one of the plurality of keys.

29. The user interface of claim 27, further comprising a printed circuit board (PCB) and a transparent member, the PCB having electrical components for controlling the generation of characters on the display, and the transparent member including the keys and being mounted to the PCB such that each of the keys are pivotable about the PCB to engage one of the plurality of switch elements.

30. The user interface of claim 24, further comprising an audio device generating a first audio indicator and a second audio indicator corresponding to the first and second positions, respectively.

31. The user interface of claim 24, further comprising a plurality of visual indicators, wherein each of the plurality of visual indicators is adjacent to one of the plurality of touch areas.

32. The user interface of claim 24, wherein at least one of the plurality of visual indicators comprises a multicolored LED.

33. A user interface, comprising:

a display having a plurality of display regions each for generating images;

a plurality of switch elements each having a first position and a second position, wherein the switch is depressable to change between the first and second positions, and wherein each of the plurality of switch elements provides a first tactile feedback to positively indicate the first position and a second tactile feedback to positively indicate the second position;

a rigid transparent member having a central portion and a plurality of transparent keys, each key defining a corresponding one of a plurality of touch areas each corresponding to and superimposed over one of the plurality of display regions, each of the keys being independently cantileverable, and wherein each of the plurality of keys is engageable with one of the plurality of switch elements to cause the change between the first and second positions and to transmit the first and second tactile feedback to a user;

wherein the plurality of touch areas are tactilely distinguishable from one another;

a mounting device for supporting the display, the switch elements and the transparent member, wherein the central portion of the transparent member is supported by the mounting device such that each of the plurality of keys is cantilevered about the central portion for engagement with one of the plurality of switch elements.

34. The automation system of claim 33, further comprising a face plate covering the transparent member, wherein the face plate has a plurality of openings further defining the extent of each of the plural of touch areas.

35. An automation system, comprising:

at least one controlled system;

a host computer in communication with the controlled system, wherein the host computer provides signals for controlling the controlled system;

a user interface in communication with at least the host computer for controlling the controlled system, wherein the user interface comprises:

a display having a plurality of display regions each for generating images;

a plurality of switch elements disposed proximal to the plurality of display regions, wherein each of the plurality of switch elements provides tactile feedback to positively indicate the activation and release of the switch element; and a rigid transparent member having a plurality of keys each defining a corresponding one of plurality of tactilely-distinguishable touch areas each corresponding to and covering one of the plurality of display regions, and wherein each of the plurality of keys is independently cantileverable and engageable with one of the plurality of switch elements to activate the switch element and to transmit the tactile feedback to a user; and a mounting device for supporting the display, the switch elements and the transparent member, wherein the transparent member is supported by the mounting device such that each of the plurality of keys is cantileverable for engagement with one of the plurality of switch elements.

36. The automation system of claim 35, wherein each of the plurality of switch elements further provides aural feedback, corresponding to the tactile feedback, to positively indicate the activation and release of the switch element.

* * * * *